United States Patent
Naik et al.

(10) Patent No.: US 9,987,659 B2
(45) Date of Patent: Jun. 5, 2018

(54) NANOTUBE ENHANCEMENT OF INTERLAMINAR PERFORMANCE FOR A COMPOSITE COMPONENT

(71) Applicant: UNITED TECHNOLOGIES CORPORATION, Hartford, CT (US)

(72) Inventors: Rajiv A Naik, Glastonbury, CT (US); John D Riehl, Hebron, CT (US); Larry Foster, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 387 days.

(21) Appl. No.: 14/886,480

(22) Filed: Oct. 19, 2015

(65) Prior Publication Data

US 2017/0106407 A1 Apr. 20, 2017

(51) Int. Cl.
- *B05D 3/12* (2006.01)
- *B32B 7/08* (2006.01)
- *B32B 27/08* (2006.01)

(52) U.S. Cl.
CPC .................. *B05D 3/12* (2013.01); *B32B 7/08* (2013.01); *B32B 27/08* (2013.01); *B32B 2255/10* (2013.01); *B32B 2255/20* (2013.01); *B32B 2260/021* (2013.01); *B32B 2260/046* (2013.01); *B32B 2305/076* (2013.01)

(58) Field of Classification Search
CPC ....................................................... B32B 27/08
USPC ......................................................... 428/105
See application file for complete search history.

(56) References Cited

U.S. PATENT DOCUMENTS

| | | |
|---|---|---|
| 7,537,825 B1 | 5/2009 | Wardle et al. |
| 8,132,487 B2 | 3/2012 | Evans et al. |
| 8,148,276 B2 | 4/2012 | Nejhad et al. |
| 8,257,678 B2 | 9/2012 | Steiner, III et al. |
| 8,337,979 B2 | 12/2012 | Wardle et al. |
| 8,557,074 B2 | 10/2013 | McCowin |
| 8,596,655 B2 | 12/2013 | Belanger et al. |
| 8,606,540 B2 | 12/2013 | Haisty et al. |
| 8,610,761 B2 | 12/2013 | Haisty et al. |
| 8,668,864 B2 | 3/2014 | Maheshwari et al. |
| 8,690,170 B2 | 4/2014 | Belanger et al. |
| 8,887,367 B2 | 11/2014 | Miller |
| 8,986,484 B2 | 3/2015 | Loftus et al. |

(Continued)

FOREIGN PATENT DOCUMENTS

AU 2006350255 A1 5/2008

OTHER PUBLICATIONS

European Extended Search Report dated Jan. 20, 2017, issued in the corresponding European Patent Application No. 16194547.2.

*Primary Examiner* — Brent T O'Hern
(74) *Attorney, Agent, or Firm* — Bachman & LaPointe, P.C.

(57) ABSTRACT

A composite article including a multiple of composite layers impregnated with a polymer matrix; and a nanotube material that facilitates a mechanical interlock between at least two of the multiple of composite layers. A method of manufacturing a composite article including a multiple of composite layers within a polymer matrix; and distributing a nanotube material between at least two of the multiple of composite layers to facilitate a mechanical interlock between the at least two of the multiple of composite layers adjacent an otherwise relatively low strength interlaminar interface region of the composite article.

16 Claims, 3 Drawing Sheets

(56) References Cited

U.S. PATENT DOCUMENTS

| | | |
|---|---|---|
| 9,004,874 B2 | 4/2015 | Jamison |
| 9,040,138 B2 | 5/2015 | Sinha et al. |
| 9,090,027 B2 | 7/2015 | Sutton et al. |
| 2009/0117363 A1* | 5/2009 | Wardle .................. B29C 66/721 428/223 |
| 2010/0098931 A1 | 4/2010 | Daniel et al. |
| 2010/0196695 A1 | 8/2010 | Garcia et al. |
| 2011/0135491 A1* | 6/2011 | Shah ........................ B64G 1/54 416/241 R |
| 2011/0236670 A1* | 9/2011 | Kunze ................. B29C 65/5014 428/313.3 |
| 2013/0034724 A1 | 2/2013 | Sodano |
| 2013/0216811 A1 | 8/2013 | Ghasemi-Nehjad et al. |

\* cited by examiner

NANOTUBE ENHANCEMENT OF INTERLAMINAR PERFORMANCE FOR A COMPOSITE COMPONENT

BACKGROUND

The present disclosure relates to polymer composite materials and, more particularly, relates to enhancement of the interlaminar performance thereof.

Polymer matrix composite materials with carbon fiber reinforcement offer significant stiffness-to-weight and strength-to-weight advantages. However, due to their relatively low through-thickness, or interlaminar interface properties, the application of these composite materials to complex aero-engine components with angle bend features such as flanges, L-sections, T-sections, sharp diameters, etc., may be a challenge, especially when the composite material is stressed in the through-thickness direction.

SUMMARY

A composite article according to one disclosed non-limiting embodiment of the present disclosure can include a multiple of composite layers impregnated with a polymer matrix; and a nanotube material that facilitates a mechanical interlock between at least two of the multiple of composite layers.

A further embodiment of the present disclosure may include, wherein the nanotube material includes carbon nanotubes.

A further embodiment of any of the embodiments of the present disclosure may include, wherein the nanotube material includes glass nanotubes.

A further embodiment of any of the embodiments of the present disclosure may include, wherein the nanotube material includes nanotubes that are generally non-aligned.

A further embodiment of any of the embodiments of the present disclosure may include, wherein the nanotube material is applied onto at least one prepreg layer of the multiple of composite layers.

A further embodiment of any of the embodiments of the present disclosure may include, wherein the nanotube material includes nanotubes that are aligned.

A further embodiment of any of the embodiments of the present disclosure may include, wherein the nanotube material includes nanotubes that form a lattice structure.

A further embodiment of any of the embodiments of the present disclosure may include, wherein the nanotube material includes multiple individual nanotubes.

A further embodiment of any of the embodiments of the present disclosure may include, wherein the nanotube material includes nanotubes that are unilaterally oriented.

A further embodiment of any of the embodiments of the present disclosure may include, wherein the nanotube material includes nanotubes that are unilaterally oriented in a manner to be transverse to at least one of the multiple of composite layers.

A further embodiment of any of the embodiments of the present disclosure may include, wherein the nanotube material is located adjacent an angle bend feature of the composite article.

A further embodiment of any of the embodiments of the present disclosure may include, wherein the nanotube material is located adjacent a relatively high stressed through-thickness region of the composite article.

A further embodiment of any of the embodiments of the present disclosure may include, wherein the nanotube material is located in an otherwise relatively low interlaminar interface region of the composite article.

A further embodiment of any of the embodiments of the present disclosure may include, wherein the nanotube material includes nanotubes that form a thermal transmission path from a relatively high temperature region to a relatively low temperature region of the composite article.

A composite article according to another disclosed non-limiting embodiment of the present disclosure can include a multiple of composite layers impregnated with a polymer matrix that forms an angle bend feature; and a nanotube material that facilitates a mechanical interlock between at least two of the multiple of composite layers adjacent the angle bend feature.

A further embodiment of any of the embodiments of the present disclosure may include, wherein the nanotube material includes nanotubes that are generally non-aligned.

A further embodiment of any of the embodiments of the present disclosure may include, wherein the nanotube material includes nanotubes that are generally aligned.

A further embodiment of any of the embodiments of the present disclosure may include, wherein the angle bend feature forms an interface adjacent an airfoil section of the composite article.

A method of manufacturing a composite article according to another disclosed non-limiting embodiment of the present disclosure can include a multiple of composite layers within a polymer matrix; and distributing a nanotube material between at least two of the multiple of composite layers to facilitate a mechanical interlock between the at least two of the multiple of composite layers adjacent an otherwise relatively low interlaminar interface region of the composite article.

A further embodiment of any of the embodiments of the present disclosure may include, distributing the nanotube material on a pre-impregnated material layer, the nanotube material adjacent an otherwise relatively low interlaminar interface region of the composite article.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
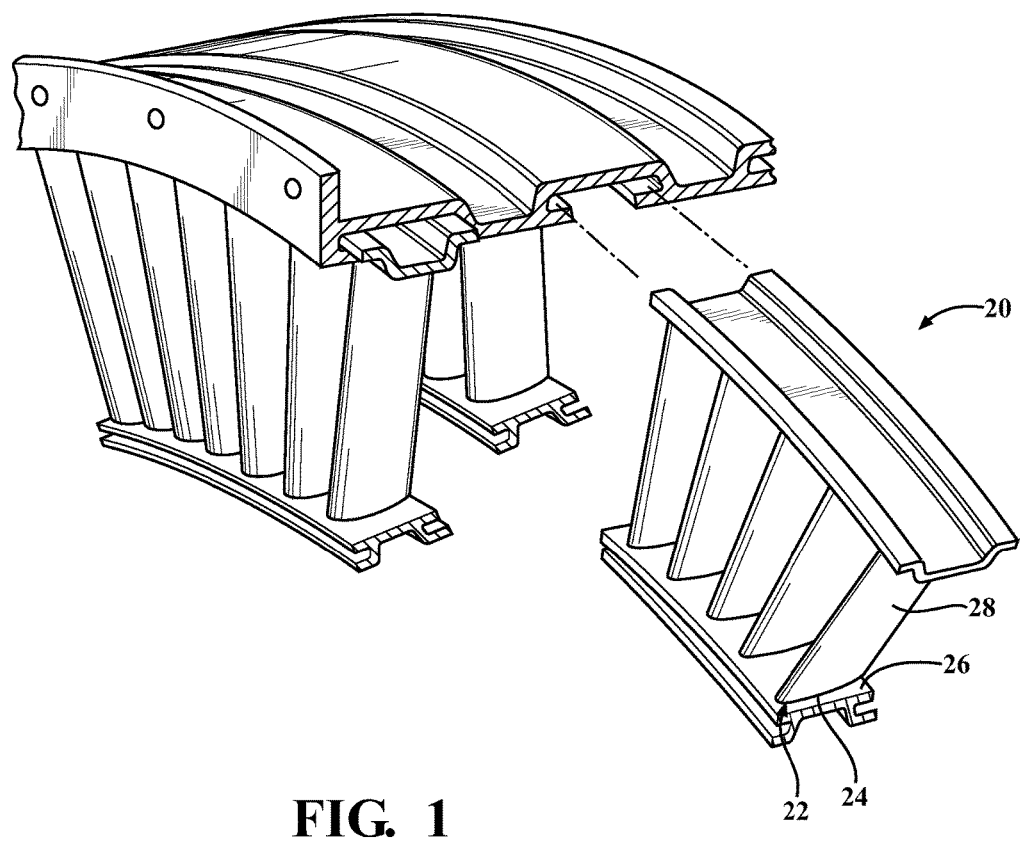
FIG. 1 is an exploded view of vane cluster with a single representative vane illustrative of a composite article.

FIG. 1 schematically illustrates a composite article 20 fabricated from a polymer composite material. The composite article 20 in one example includes an angle bend feature 22 that may be relatively highly stressed in the through-thickness direction. In this example, the composite article 20 is a stator vane for use in a gas turbine engine and the angle bend feature 22 may be a transition region 24 between a vane platform 26 and an airfoil section 28 of the composite article 20. It should be appreciated that although a stator vane example is illustrated herein, other aerospace components, aircraft structures, as well as a wide variety of applications outside the aerospace industry, which may be fabricated from polymer composite materials that have a local region of high interlaminar stress or require impact resistance will benefit herefrom. In other words any area with a relatively low strength interlaminar interface.

Figure 2:
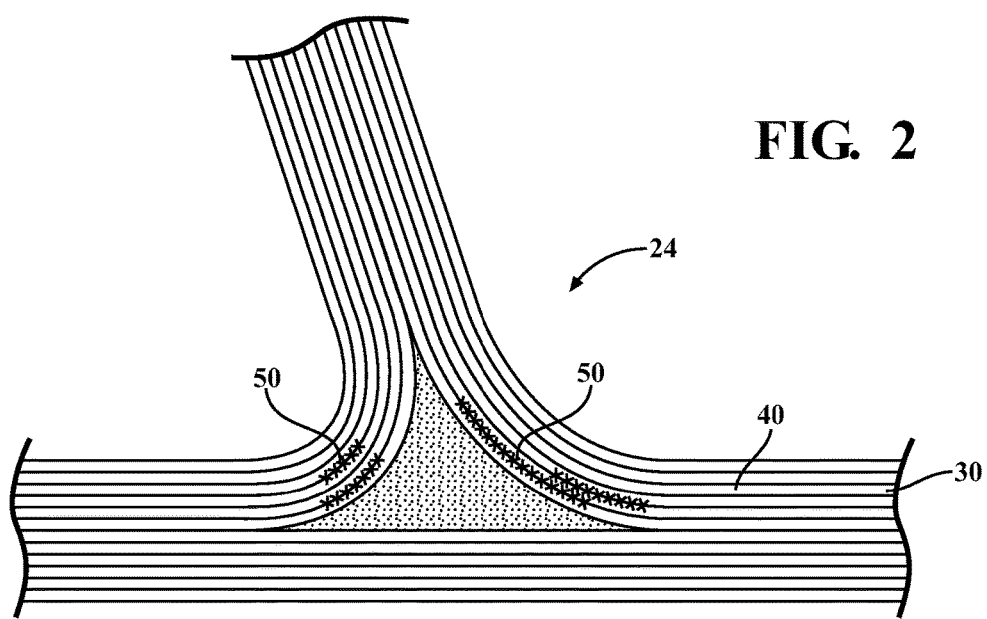
FIG. 2 is a sectional view of the composite article.

With reference to FIG. 2, the composite article 24 has a laminate construction manufactured of individual composite layers 30 and a polymer matrix 40 reinforced with a nanotube material 50. The polymer matrix 40 is impregnated into the composite layers 30 and the nanotube material 50 is inserted between two adjacent composite layers 30 such that during processing the nanotube material 50 may interpenetrate the layers 30. It should be appreciated that although the nanotube material 50 is schematically illustrated as between two layers 30, the nanotube material 50 may be located within or upon multiple polymer composite layers 30. The composite article 20 can be fabricated by a wide variety of fabrication techniques including, but not limited to, autoclave curing, out-of-autoclave curing, compression molding, resin transfer molding and vacuum assisted resin transfer molding, which for example, facilitate impregnation of the individual composite layers 30 and the polymer matrix 40.

The composite layers 30 are stacked, shaped and cured according to various practices to produce the laminate construction. It should be appreciated that various numbers and arrangements of composite layers 30 will benefit herefrom irrespective of that schematically illustrated. In addition, a core material, such as a lightweight foam or honeycomb pattern material, could be incorporated into the laminated composite structure, as is common for aircraft engine nacelle components such as engine inlets, thrust reversers, cowlings, as well as other aerostructures.

The polymer matrix 40 within the composite layer 30 merges with the fibers of the composite layer 30 and contributes to the structural integrity and other physical properties of the composite article 20. Materials for the polymer matrix 40 may include various materials that exhibit temperature and impact resistance suitable for withstanding Foreign Object Damage and other types of damage to which the composite article 20 is likely to be subjected. Example polymer matrix 40 materials include suitable resin systems such as thermoset and thermoplastic materials, i.e., epoxies, bismaleimides, polyimides, polyetheretherketone (PEEK), poly(aryl) etherketoneketone (PEKK) and polyphenylene sulfide (PPS), though the use of other matrix materials is foreseeable.

Figure 3:
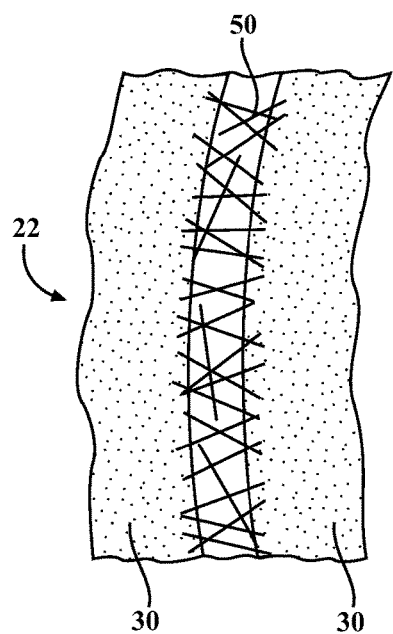
FIG. 3 is an enlarged sectional view of the composite article according to one disclosed non-limiting embodiment.

With reference to FIG. 3, the nanotube material 50 may include carbon or glass nanotubes 52. The nanotube material 50 may be located locally at the interfaces between composite layers 30 such as in and around the angle bend regions 22. The nanotube material 50 facilitates a mechanical interlock at the local region of its application, such as the relatively weak interlaminar regions of the composite lay-up to enhance strength and fatigue capability of the composite article 20.

In one embodiment, the nanotube material 50 can be applied to the surface of a prepreg material layer which would result in the nanotubes residing in the interface region between layers. However, there are multiple approaches for nanotube material 50 integration such that the nanotube material 50 can reside in, for example, exclusively between layers or within and between layers i.e. in all resin locations.

The nanotube material 50 can be applied in various manners, including but not limited to, 2D fabrics and tapes, multi-layered braided structures, hybrid structures such as 3D woven cores with fabric skins, as well as pre-impregnated material forms and dry, or tackified, material forms. In one embodiment, the nanotube material 50 may be generally non-aligned such that the nanotube material is relatively randomly distributed. For example, the nanotubes 52 may be mixed-in with the polymer matrix 40 and/or sprinkled onto a particular composite layer 30 where the interlaminar stresses are expected to be relatively high.

The nanotube material 50 can be applied selectively upon one or more composite layers 30 where the interlaminar stresses are expected to be high. For example, the nanotube material 50 may be locally spread, i.e., "sprinkled" in a region between particular composite layers 30. Alternately, or in addition, the nanotube material 50 may be distributed onto the entirety of one or more composite layers 30 to facilitate ballistic resistance to form, for example, a blade containment belt, a fan blade, or other ballistic resistant structure.

Figure 4:
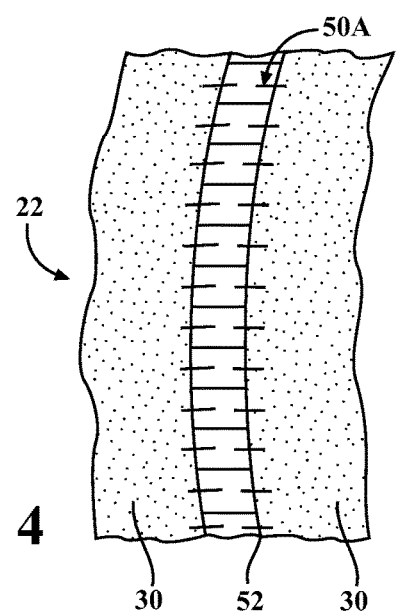
FIG. 4 is an enlarged sectional view of the composite article according to one disclosed non-limiting embodiment.

With reference to FIG. 4, in another embodiment, the nanotube material 50A may be arranged in an aligned configuration. In one example, the nanotube material 50 may include numerous nanotubes 52 that are arranged to provide a "forest" of nanotubes 52 that are generally unilaterally aligned one to another so as to penetrate into the adjacent composite layers 30 to provide a mechanical interlock. That is, the nanotubes 52 are generally unilaterally oriented in a manner to be transverse to the adjacent composite layers 30. The nanotubes 52 may, for example, be applied, e.g., grown upon the substrate, and or directly applied to one or more of the composite layers 30 via a chemical vapor deposition process.

Figure 5:
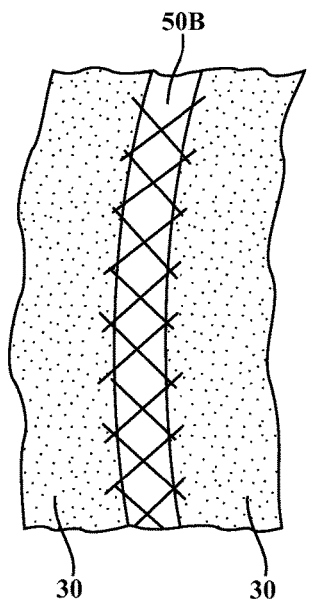
FIG. 5 is an enlarged sectional view of the composite article according to one disclosed non-limiting embodiment.

In still another embodiment, as shown in FIG. 5, the nanotube material 50B includes nanotubes 52 that are arranged with respect to the substrate to form a "crisscross" or other lattice structure to facilitate a mechanical interlock. That is, the nanotubes 52 are arranged in a pattern other than a "forest" type orientation.

Figure 6:
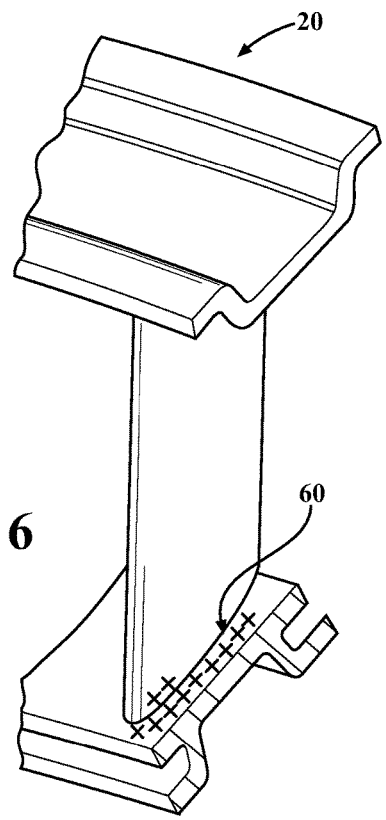
FIG. 6 is an expanded view of a vane with a nanotube material path therethrough.

With reference to FIG. 6, in another embodiment, the nanotube material 50 may be located along a path 60 (illustrated schematically) in the composite article 20. The path 60 may, for example, provide a thermal transmission path from a relatively high temperature area such as the airfoil 28 to a relatively low temperature area, such as the platform 26, to facilitate thermal management. That is, the nanotube material 50 can facilitate thermal transmission in addition to the mechanical interlock.

Figure 7:
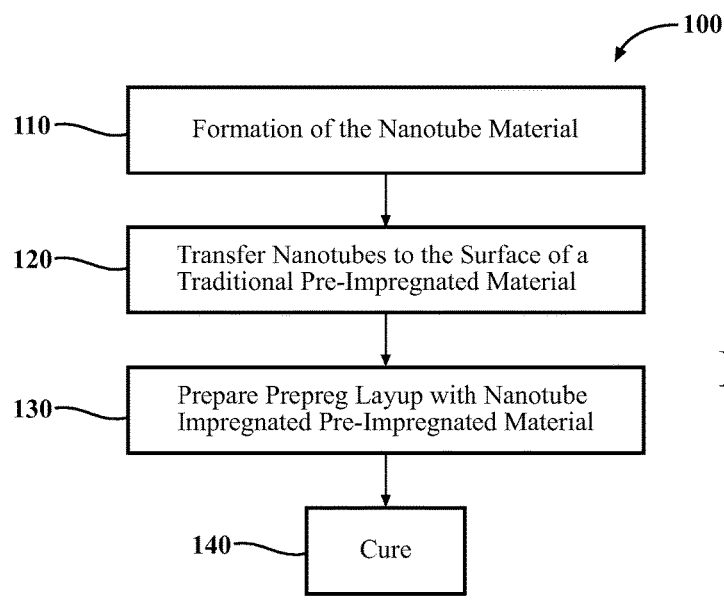
FIG. 7 is a method of manufacturing a composite article with a nanotube material.

With reference to FIG. 7, one disclosed non-limiting embodiment of a method 100 to manufacture the composite article 20 initially includes formation of the nanotube material 50 such as via a "forest" of aligned nanotubes 52 that may be manufactured on a substrate material (step 110). Next, the nanotubes 52 are transferred from the substrate to the surface of a traditional pre-impregnated material (step 120). It should be appreciated that although a single pre-impregnated material is disclosed, multiple layers may include the nanotubes 52. Next, individual plies from the prepreg layup for manufacture of the composite component 20 are cut and stacked with the nanotube impregnated pre-impregnated material incorporated therein (step 130). As described, the nanotube material 50 may be locally applied at the interfaces between composite layers 30 in and around, for example, the angle bend regions 22. The ply lay-up is then cured (step 140). For example, the curing may be performed with standard composite fabrication techniques to form the composite article 20.

The utilization of the nanotube material 50 increases interlaminar strength and fatigue properties with potentially lower manufacturing costs through the use of relatively less expensive polymer resins rather than relatively higher cost toughened polymers or other costly means to otherwise enhance interlaminar properties. The utilization of the nanotube material 50 may also facilitate the use of polymer composites in regions and applications that were previously limited due to low interlaminar properties of the material to increase performance and enable more widespread use of light-weight polymer composite materials as the nanotube material 50 may relatively facilitate reduction in separation between the composite layers 30.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A composite article, comprising:
   a multiple of composite layers impregnated with a polymer matrix that forms an angle bend feature; and
   a nanotube material residing in the angle bend feature to penetrate at least two of the multiple of composite layers to form a mechanical interlock between the at least two of the multiple of composite layers, wherein the nanotube material is located adjacent an angle bend feature between an airfoil region and a platform region, the airfoil region transverse to the platform region.

2. The composite article as recited in claim 1, wherein the nanotube material includes carbon nanotubes.

3. The composite article as recited in claim 1, wherein the nanotube material includes glass nanotubes.

4. The composite article as recited in claim 1, wherein the nanotube material includes nanotubes that are non-aligned.

5. The composite article as recited in claim 1, wherein the nanotube material is sprinkled onto at least one prepreg layup layer of the multiple of composite layers.

6. The composite article as recited in claim 1, wherein the nanotube material includes nanotubes that are aligned.

7. The composite article as recited in claim 1, wherein the nanotube material includes nanotubes that form a lattice structure.

8. The composite article as recited in claim 1, wherein the nanotube material includes multiple individual nanotubes.

9. The composite article as recited in claim 1, wherein the nanotube material includes nanotubes that are unilaterally oriented.

10. The composite article as recited in claim 9, wherein the nanotube material includes nanotubes that are unilaterally oriented in a manner to be transverse to the at least two of the multiple of composite layers.

11. The composite article as recited in claim 1, wherein the nanotube material is located adjacent a stressed through-thickness region of the composite article.

12. The composite article as recited in claim 1, wherein the interface region is an interlaminar interface region of the composite article.

13. The composite article as recited in claim 1, wherein the nanotube material includes nanotubes that form a thermal transmission path from a first temperature region to a second temperature region of the composite article.

14. A composite article, comprising:
    a multiple of composite layers impregnated with a polymer matrix that forms an angle bend feature between an airfoil region and a platform region; and
    a nanotube material residing at the angle bend feature to penetrate at least two of the multiple of composite layers to form a mechanical interlock between the at least two of the multiple of composite layers at the angle bend feature.

15. The composite article as recited in claim 14, wherein the nanotube material includes nanotubes that are non-aligned.

16. The composite article as recited in claim 14, wherein the nanotube material includes nanotubes that are aligned.

* * * * *